Figure 1A:
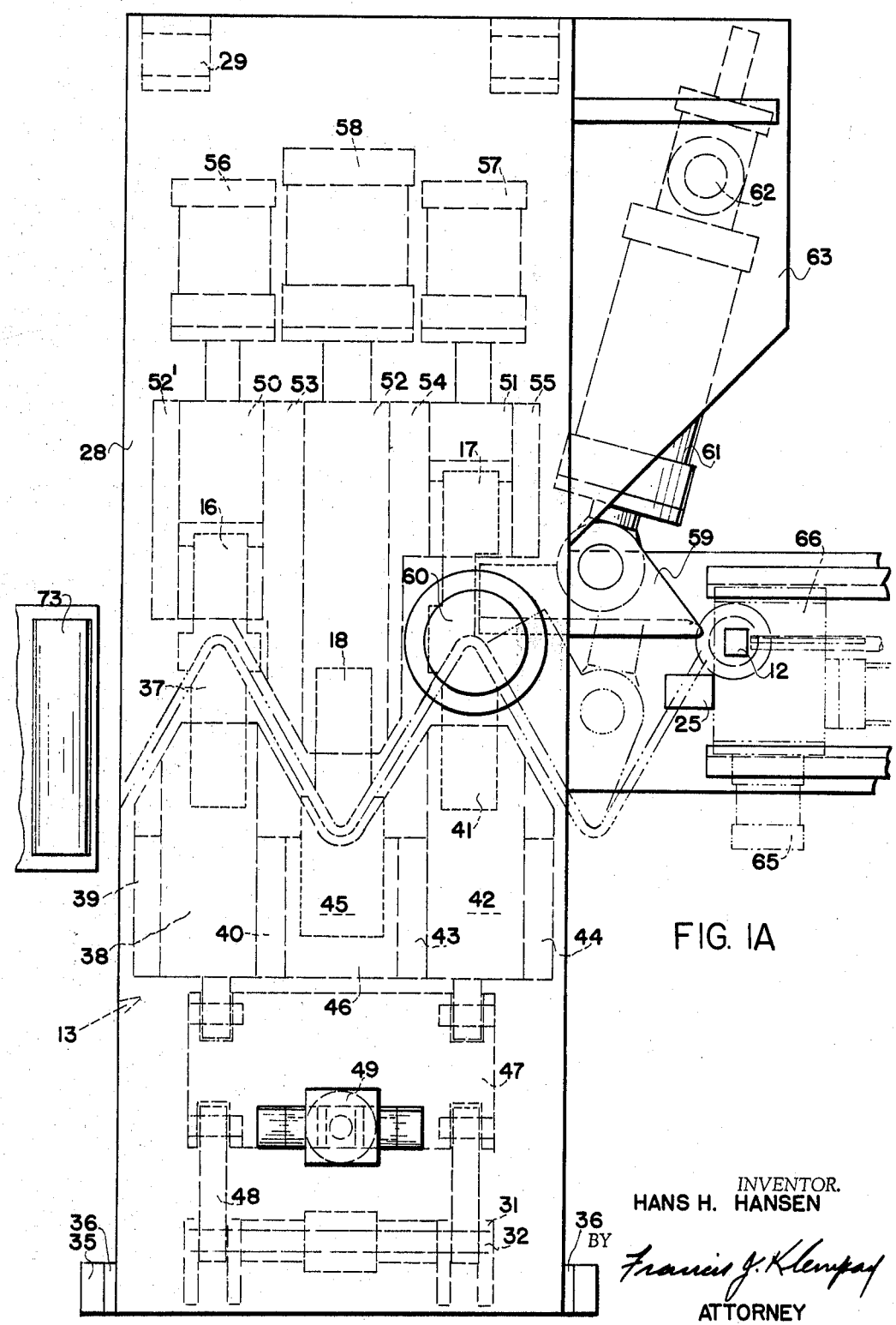
Figure 3A:
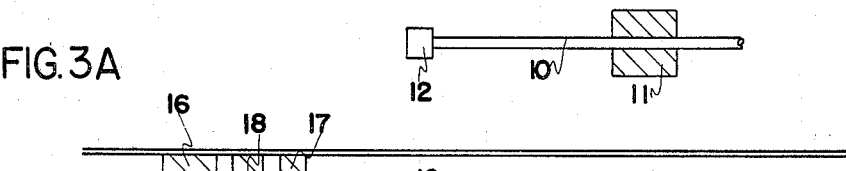
Figure 3B:
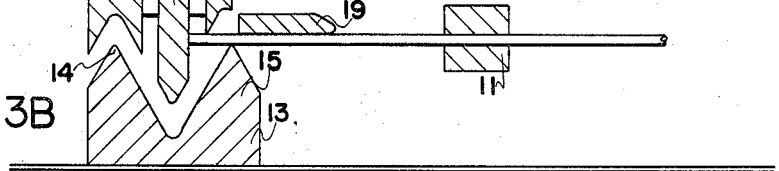
Figure 3C:
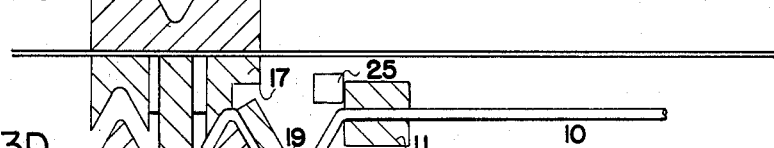
Figure 3D:
Figure 3E:
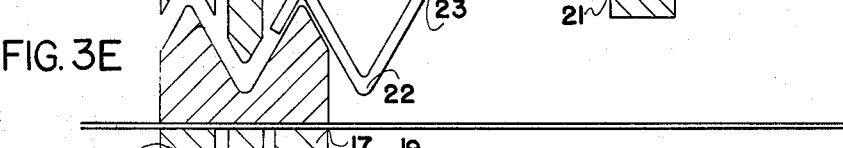
Figure 3F:
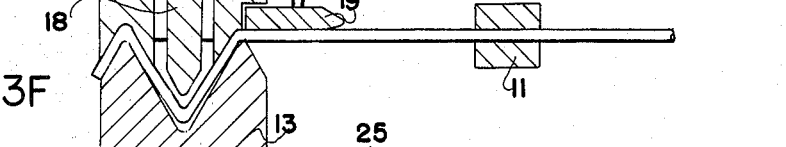
Figure 3G:
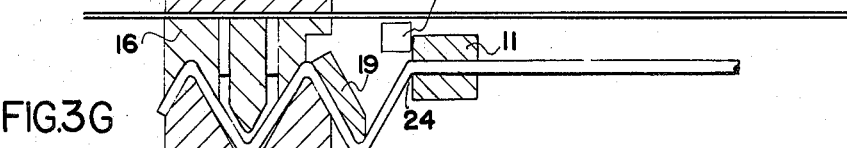
Figure 3H:
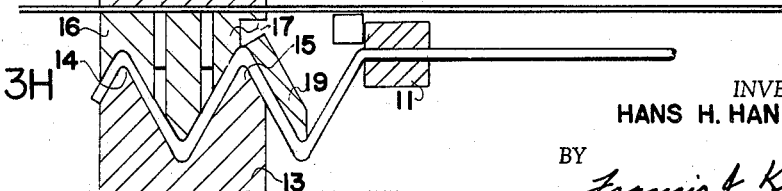

April 19, 1966     H. H. HANSEN     3,246,500
APPARATUS FOR MAKING BAR WEBS FOR STEEL JOISTS
Filed Aug. 9, 1962     5 Sheets-Sheet 1

INVENTOR.
HANS H. HANSEN
BY
Francis J. Klempay
ATTORNEY

April 19, 1966  H. H. HANSEN  3,246,500
APPARATUS FOR MAKING BAR WEBS FOR STEEL JOISTS
Filed Aug. 9, 1962  5 Sheets-Sheet 2
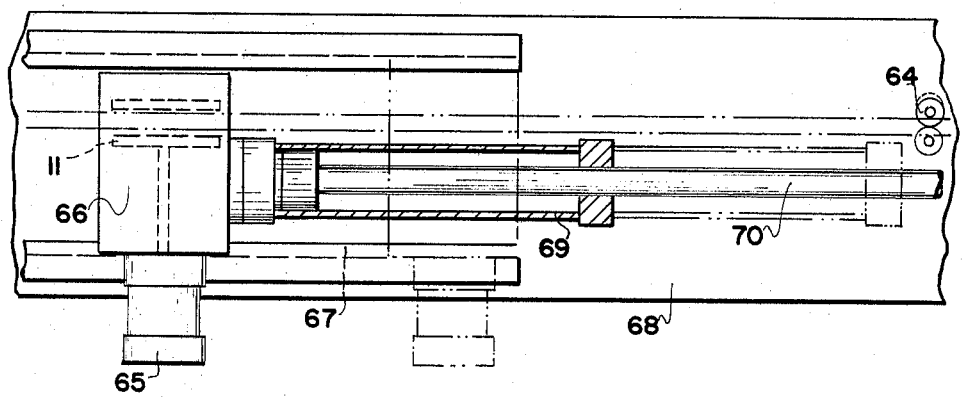
FIG. IB
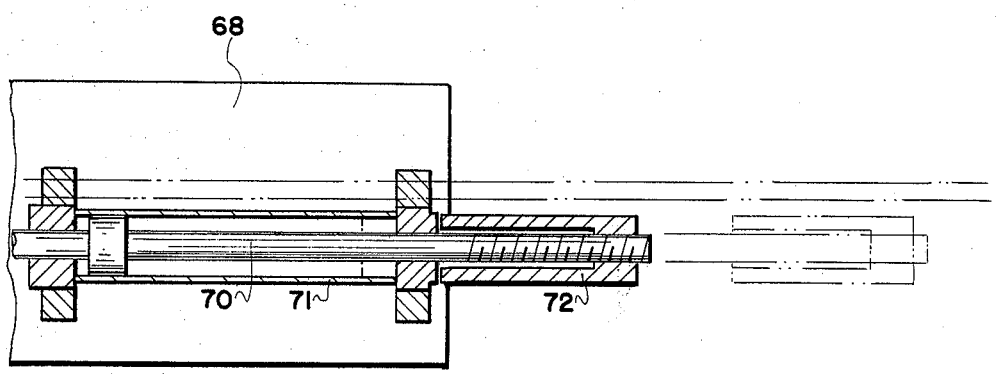
FIG. IC
INVENTOR.
HANS H. HANSEN
BY
ATTORNEY

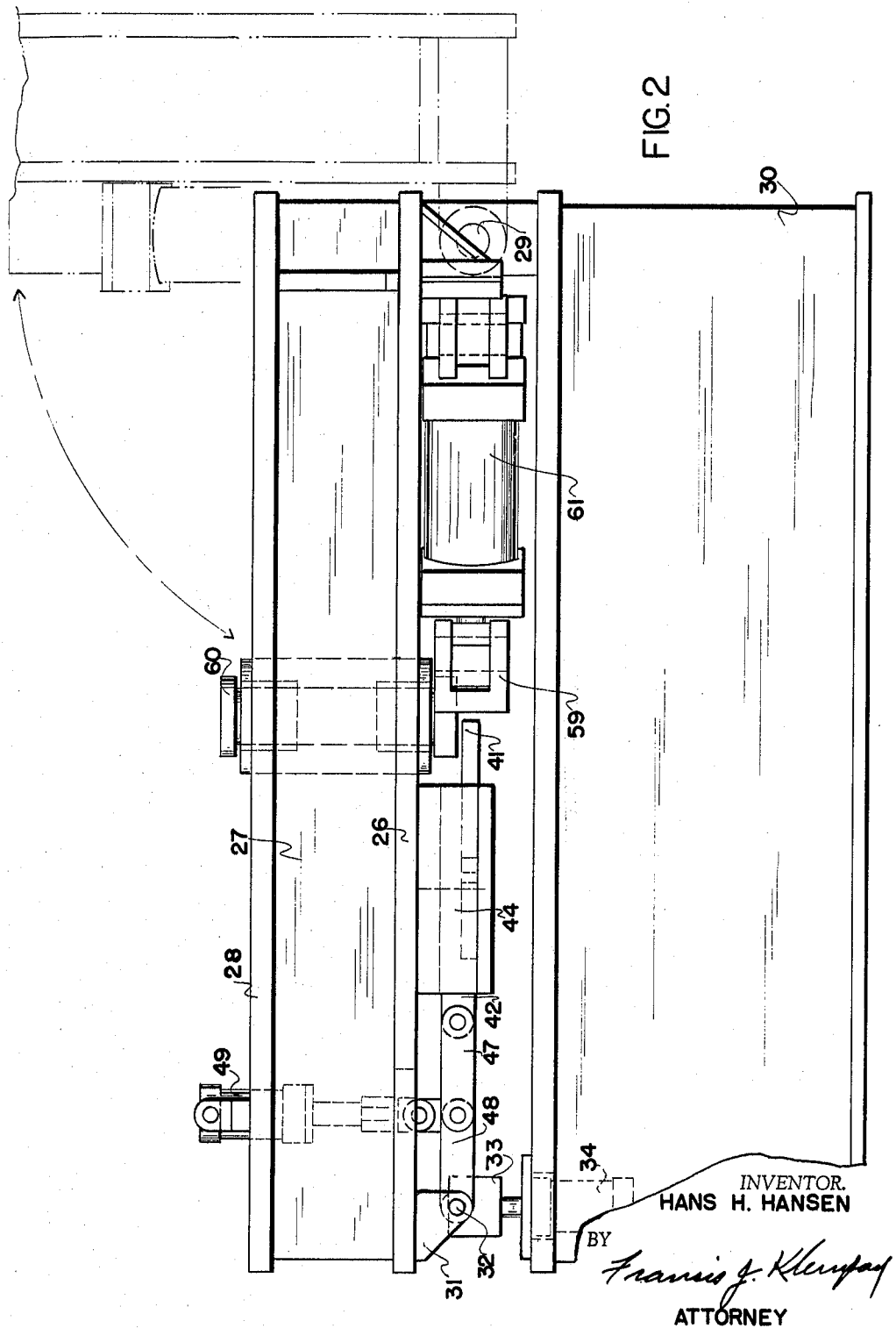

April 19, 1966  H. H. HANSEN  3,246,500
APPARATUS FOR MAKING BAR WEBS FOR STEEL JOISTS
Filed Aug. 9, 1962  5 Sheets-Sheet 4

INVENTOR.
HANS H. HANSEN
BY Francis J. Klempay
ATTORNEY

April 19, 1966     H. H. HANSEN     3,246,500
APPARATUS FOR MAKING BAR WEBS FOR STEEL JOISTS
Filed Aug. 9, 1962     5 Sheets-Sheet 5

INVENTOR.
HANS H. HANSEN
BY
*Francis J. Klempay*
ATTORNEY

United States Patent Office 3,246,500
Patented Apr. 19, 1966

3,246,500
APPARATUS FOR MAKING BAR WEBS FOR STEEL JOISTS
Hans H. Hansen, Cortland, Ohio, assignor to The Taylor-Winfield Corporation, Warren, Ohio, a corporation of Ohio
Filed Aug. 9, 1962, Ser. No. 215,845
15 Claims. (Cl. 72—297)

This invention relates to improved and simplified apparatus for imparting a series of longitudinally spaced reverse bends in steel rods to be used as the web members in steel joists having upper and lower chord members rigidly welded to the nodes thus formed in the bar webs. The principal object of the invention is the provision of apparatus for so forming these webs from straight lengths of steel rods in a highly accurate and consistent manner and at high commercial production speeds while yet requiring a minimum of complexity and parts in the apparatus.

Another object of the invention is the provision of apparatus for the purpose stated above and having the characteristics outlined above which embodies novel and improved concepts to facilitate the interchange of bending dies whereby the apparatus may be readily changed over to make webs of different pitch between the bends and of different height or dimension between the adjacent reverse bends of the webs. Yet another object of the invention is the provision of an improved arrangement to index the forward longitudinal feeding of the stock pieces to make the successive reverse bends in the same.

The concept of apparatus herein disclosed also includes the very desirable feature of mounting all of the operative forming (bending) equipment on a single slab of steel plate in such manner that all of the substantive forces resulting from the forming operations are resolved into the plane of the slab whereby the construction is extremely rugged and durable yet very simple in arrangement and readily available for die interchange as mentioned above. In regard to this latter feature the assembly of the slab, dies, and actuating means for the dies may be considered as a unitary one capable of being opened up from the main base of the machine, feed mechanism, etc., to facilitate maintenance, repair, and die interchange. Further, this concept enables the overall machine to be made quite compact—requiring but minimum of factory floor space.

A still further object of this invention is to provide a method for increasing the accuracy of the pitch and height dimensions of the formed webs so that still less difficulty will be encountered in the operation of succeeding automated equipment which welds the above mentioned top and bottom chords to the webs in making steel joists. This is accomplished by imparting a final stretching and coining step to successive segments of the bent stock between adjacent bends of one direction. The stretching may be slightly beyond the elastic limit of the stock so that a permanent set is imparted to the formed web before the dies are released therefrom. While this final step requires considerable force the above mentioned slab method of countering the resultant heavy force reaction is most adequate while yet keeping the overall weight and complexity of the equipment to a minimum.

The above and other objects and advantages of the invention will become apparent upon consideration of the following specification and the accompanying drawing wherein there is disclosed a preferred embodiment of the invention.

Figure 5:
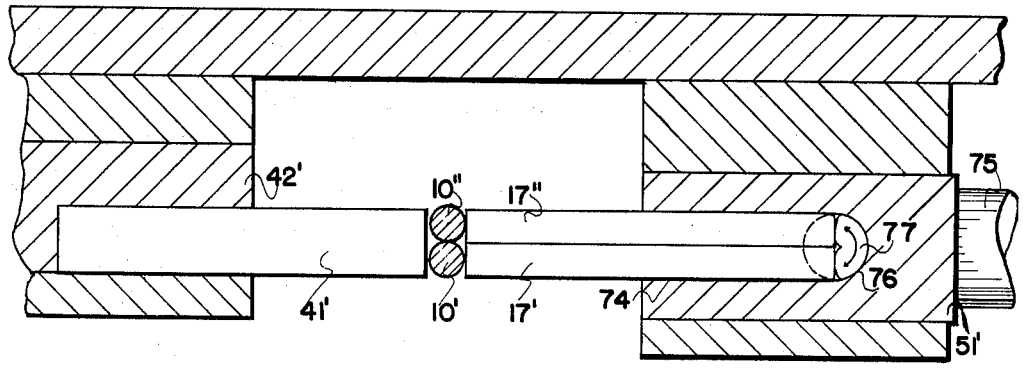
Figure 4:
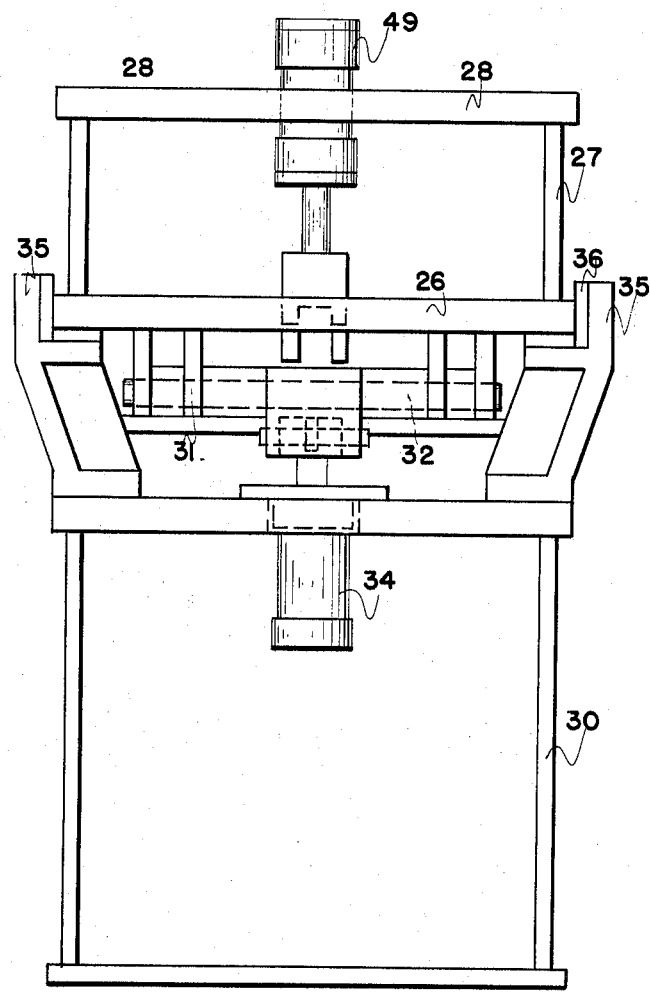

In the drawing:
FIGURE 1, consisting of parts A, B and C on two sheets, is a plan view, partly in section, of a web bending machine constructed in accordance with the principles of my invention;

FIGURE 2 is a fragmentary end elevation of a portion of the apparatus of FIGURE 1;
FIGURE 3, consisting of parts A through H, is a schematic showing of the forming (bending) method utilized in the apparatus of FIGURE 1;
FIGURE 4 is a side elevation of a portion of the apparatus of FIGURE 1; and
FIGURE 5 is a detailed view of an arrangement for equalizing die clamping pressure on the work pieces when the apparatus is set up to form two webs simultaneously in side-by-side relation.

Referring first to FIGURE 3, reference numeral 10 designates a length of steel rod stock which is fed intermittently into the forming equipment (to the left in FIGURE 3) by a sliding clamp 11. For a purpose to be later described, the leading end of the stock piece is first abutted against a retractable stop 12. Reference numeral 13 denotes a schematic showing of an anvil die which has a generally V-shaped recess and longitudinally spaced radiused nodes 14 and 15 which define the longitudinally spaced edges of the recess. As will appear hereinafter the anvil die assembly 13 is, in actual practice, an assembly of separate parts and the nodes 14 and 15 are slightly retractable from the work piece so that the latter may be freed of the die assembly for longitudinal indexing.

Reference numeral 16 designates a transversely movable and V-shaped coining and clamping die mounted opposite of and adapted to coact with the node 14 of the anvil die assembly 13. Arranged to coact with the tip and the inner side face of the node 15 of the anvil die assembly is a second clamping and coining die 17 which is also mounted for transverse movement with respect to the principal longitudinal axis of the stock piece and the work being formed. Intermediate the clamping die 16 and 17 is a punch 18 having a reduced and tapered inner end to be nestingly received within the bottom portion of the V-shaped recess of the anvil die assembly 13. As will appear hereafter and for the purpose to be hereinafter described, the dies 16 and 17 and the punch 18 are each independently actuated for transverse inward and outward movement.

Also included in the total die assembly shown schematically in FIGURE 3 is a wind die 19. While not particularly shown, this die 19 is mounted for limited sliding movement on a wing which is pivotally mounted for rotation about the center axis of the radius on the node 15 of the anvil die assembly 13. An eccentric pin interconnection between said wing and die 19, not shown herein but shown in FIGURE 8 of U.S. Patent No. 2,937,686, is provided to cause the limited relative sliding movement between the wing and die whereby the die will have rolling action on the work piece rather than the sliding movement thereon.

Considering now the sequence of operations of the respective parts shown in FIGURE 3 and the forming method resulting therefrom, the sliding clamp 11 is retracted a predetermined distance back along the work piece 10 after the first index of contact with stop 12 and thereafter this stop is retracted. The clamp with the stock is now advanced a predetermined distance into the opened die set. Note that the stock moves very closely underneath the die 19 and that the die 19 is restrained against upward movement. Die 17 is now actuated to form a half bend in the work piece adjacent its end, and while the die 17 remains clamped on the work piece this bend is completed by downward swinging movement of the die 19 as shown in FIGURE 3D. Die 19 is reduced at its outer free end as shown at 20, and by means to be hereinafter described the clamp 11 is yieldingly restrained against inward movement as the die 19 swings downwardly. It should also be mentioned that while not particularly shown in the drawings the exit end of one of the jaws of the clamp 11 is also radiused as at 21. Therefore the result of the downward swinging movement of the die 19 is to complete the bend in the stock about the node 15 while at the same time forming the first reverse bend in the stock at 22 and also forming one half of the next succeeding bend as at 23. Thereafter, the complete die set is opened, the stock is released therefrom, and through an arrangement to be hereinafter described the complete die set is retracted from the stock to enable the stock to be indexed longitudinally and reclosed onto the first bends as shown in FIGURE 3F wherein the wing die 19 remains at its initial retracted position while the dies 16 and 17 are clamped hard onto the stock about the nodes 14 and 15 of the anvil die assembly 13. This longitudinal indexing of the work piece is, of course, accomplished by the sliding clamp 11 in a manner to be hereinafter described.

After the work piece is indexed and clamped as shown in FIGURE 3F the wing die 19 is again actuated to form the second or next succeeding reverse bend 22′ while simultaneously completing the half bend 23 and forming one half of the next succeeding forward bend as indicated at 24. Again, the inward movement of the clamp 11 was yieldingly restrained against inward movement during this downward swinging cycle of the die 19.

Also included in the components shown in FIGURE 3 is a stop 25 which is adjustable longitudinally along the path of travel of the work piece and in actual practice this stop is so adjusted that the bends made by the wing 19 are slightly undersize in the sense that the distance between the bend completed by the die 19 and the bend half completed by die 19 (all in FIGURE 3D) is somewhat less than what it should be. This is evidenced by the showing in FIGURE 3F where the two legs of the first V-section of the work piece are stretched apart slightly by closing movement of the dies 16 and 17. After the second bending cycle is made as in FIGURE 3G and with the dies 16, 17 and 19 all clamped onto the work the punch 18 is actuated to stretch these two legs beyond their elastic limit and into a final coined and permanently set condition of close tolerance dimension as shown in FIGURE 3H. This method of forming and correction results in a completed web having uniform pitch between the bends, uniform web height and uniform bend configuration. Further, since there is little or no springback these tolerances are permanently set into the product and the product is accordingly better adapted for use in subsequent automated fabricating processes.

Referring now to FIGURES 1 and 2, the essential components of the above described FIGURE 1 with the exception of the feed clamp 11 are all mounted underneath a slab-like plate 26 which forms the bottom member of a box-like frame 27 having an upper plate 28. It should be obvious that this construction provides a carrier which is exceedingly strong in either tension or compression in any horizontal direction and which is highly resistant to bending or deflection. This frame 27 is pivotally mounted at one transverse end on a pair of widely separated pin hinges 29 which are mounted on the upper end of a transversely extending base 30. Depending from the other end of the slab 26 are a plurality of apertured ears 31 which receive a pin 32, the latter being received in a bore formed in a fitting 33 which is mounted on the piston rod of a cylinder 34 carried by the base 30. In normal operation, the cylinder 34 is actuated in preparation for each feed indexing movement of the work pieces to vertically raise the center portion of the slab 26 and the dies carried thereby sufficiently to permit the longitudinal movement of bent portions of the work pieces. As shown in FIGURES 1A and 4 the base 30 has a pair of heavy upstanding lugs 35 mounting inwardly facing wear plates 36 to keep the slab 26 and the dies mounted thereon in proper transverse alignment with respect to the longitudinal path of movement of the work pieces through the apparatus.

Considering now the detailed construction of the anvil assembly 13, FIGURE 1A indicates that that portion which provides the node 14 comprises a tapered die 37 held in a holder 38 while that portion of the die assembly 13 which forms the node 15 is provided by a tapered die 41 mounted in a holder 42. Holders 38 and 42 are separated by spacing blocks 40 and 43 and a third holder 46 which mounts a V-shaped die 45. Holders 38, 42, 46 and spacers 40, 43 are secured together as a unit, being slideable between blocks 39 and 44 secured to slab 26, and this unit is pivotally connected to a toggle plate 47 of a toggle assembly having links 48 which are pivotally connected at one end to the plate 47 and at their opposite or outer ends to the pin 32. As shown in FIGURE 2 the toggle 47, 48 is arranged to be actuated by a cylinder 49 which is carried by the frame 27, and it should be apparent that upon actuation of this cylinder 49 in an upward direction the toggle will be broken to retract the dies 37, 41 and 45 with respect to the work to thereby free the formed web portion from the anvil die assembly.

Dies 16, 17 and 18 are mounted similarly to the dies 37 and 41 on sliding holders 50, 51 and 52, respectively, which are guided by blocks 52′, 53, 54 and 55 which are also rigidly but detachably secured to the bottom surface of the slab 26. As shown in FIGURE 1A, the dies 16, 17 and 18 are individually and independently actuated by hydraulic cylinders 56, 57 and 58, respectively, which are also rigidly but detachably mounted on the surface of slab 26. To pivotally mount the carrier wing (59) for the swinging die 19 I provide a heavy pin 60 which is vertically journalled in the frame 27. Wing 59 is arranged to be operated in either inwardly or outwardly swinging movement by a double-acting hydraulic cylinder 61 which is pivotally mounted at 62 to an extension 63 of the frame 27 and which has its piston rod pivotally connected to the wing 59 as shown in FIGURE 1A.

It should be noted at this point that all of the operative elements of the work piece bending, stretching and coining mechanism with the exception of the slide clamp 11 are mounted on the frame 27 so that all this mechanism is free to rock up and down about the pivot point 29—flexible conduits, not shown, being provided to supply fluid to each of the five hydraulic cylinders which are mounted on the frame 27. As illustrated by the die 41 in FIGURE 2, the various dies 16–19, 37, 41 and 45 are plate or slab like in form and lie flat in a horizontal plane so that these dies need be raised only a slight amount to clear the previously bent portions of the work piece and thereby permit the work piece to be slid in a longitudinal direction underneath the dies. While not shown herein suitable table-like supports are mounted on the base 30 to keep the work piece in proper elevation with respect to the dies but no part of such support means or of the work piece is elevated when the frame 27 is rocked upwardly by the cylinder 34 to permit of longitudinal indexing movement of the work piece.

Considering now the apparatus for longitudinally feeding the work piece or pieces into the forming machine, the same consists primarily of the sliding clamp 11 assisted by pinch rolls 64 (FIGURE 1B). The clamp 11 and an actuating cylinder 65 therefor are mounted on a carrier 66 which is slideably mounted for longitudinal movement in ways 67 formed in an elongated frame 68 extending longitudinally outward of the base 30, and, in practice, secured thereto. Carrier 66 also mounts a double-acting fluid cylinder 69 whose piston rod 70 extends outwardly of the end of the cylinder which is furthest removed from carrier 66. The outermost end of frame 68 mounts a second double-acting fluid cylinder 71 in alignment with the rod 70 and having a piston therein which is carried on this rod 70. For a purpose to be later described the rod 70 extends entirely through the cylinder 71 and has a threaded free end portion on which is affixed the adjustable nut 72.

Normally, the right end portion of cylinder 69 (as viewed in FIGURE 1B) is kept supplied with fluid under predetermined pressure so that the piston therein remains bottomed against the left end of the cylinder. At the very start of operations the clamp 11 is open and the work piece 10 is advanced by pinch rolls 64 until the leading end of the work piece engages the stop 12. At this time the clamp 11 is actuated, the stop 12 retracted, and the right end of cylinder 71 is supplied with fluid under pressure to move the piston therein and consequently the rod 70 to the left a predetermined distance as determined by the setting of the nut 72, it being understood that at the start of operations the piston in cylinder 71 was in its bottomed right position. This advances the leading end of the work piece the desired distance beyond the node 15 of the anvil die assembly 13. This may or may not coincide with the entering face of the punch 18, depending on the design of the product. Thereafter, as the wing die 19 swings downwardly, as in FIGURE 3D the predetermined oil pressure in the right end of cylinder 69 resists inward movement of the sliding clamp 11 in the manner described above, the oil in the right end of cylinder 69 being allowed to exhaust through a variable relief valve, as is well understood in the art, to maintain a predetermined pressure in the right end of cylinder 69 as this cylinder is being moved to the left with respect to its piston. Eventually, the slide 66 and/or the clamp 11 reaches the adjustable stop 25 so that a predetermined incompleteness of bending (by the die 19) results for the purpose above described. After the first bend is completed, as in FIGURE 3D, the clamp 11 is opened and fully retracted by reversed actuation of cylinder 71 and by allowing the fluid pressure in the right end of cylinder 69 to again bottom the piston therein on the left end of the cylinder. Upon completion of this full retraction the clamp 11 is again actuated and if the bending and stretching dies are elevated and are free and clear of the bent web portion the right end of cylinder 71 is again energized to advance the work piece a predetermined distance equal to the interval between the same direction bends in the same. The finished portions of the web piece move out of the apparatus on a suitable conveyor 73, and the positioning of the work piece as such that upon lowering of the die set the bends previously imparted by the wing die 19 will be in approximate register with the nodes 14 and 15 of the assembled anvil die and in proper position to be engaged, clamped and stretched by the various dies 16–19, 37, 41 and 45 in the next succeeding cycle of operation of the apparatus.

When simultaneously bending two work pieces arranged in side-by-side relation a problem arises as regards uniformity of bending and stretching in the two pieces. The pieces must be individually gripped, particularly at their bends which overlie the nodes 14 and 15 when the stretching operation is taking place. In FIGURE 5 I illustrate a solution to this problem wherein, by way of example, I show two dies 17' and 17" which, in a double capacity machine, would replace the die 17 first described. These dies 17' and 17" are in flat overlying relation, as shown, and are arranged to clamp the two work pieces 10' and 10" against the anvil die 41' which is doubled in thickness with respect to the die 41 first described. The dies 17' and 17" are received for a substantial portion of their length in a slot 74 formed in the slideable carrier 51' which corresponds generally in function with the slideable die holder 51 first described above. Again, holder 51' is connected through a rod (75) to a suitable actuating cylinder. The bottom of the slot 74 is rounded, as shown at 76 and positioned in this bottom of the slot is a rotatable half-round 77 whose flat face is machined to have rocking action against the ends of the dies 17' and 17". The operation of this assembly is such that if during inward clamping movement of the sliding holder 51 one of the dies 17', 17" should contact its work piece first and tend to exert more clamping pressure on the same the half-round 77 will rotate slightly to equalize the forces transmitted through the dies. In this manner, normal variations in the thicknesses or diameters of the work pieces and unequal wear of the dies, etc., is compensated for and equal clamping pressure will be exerted on the two work pieces. It should be understood that the same arrangement may be provided for clamping the work pieces on the node 14 of the anvil die assembly by making either the male or female die of this clamp in two overlying parts with means in the mounting slot to equalize the clamping pressure exerted through these two parts.

To provide for the ready maintenance, repair and/or interchange of the complete die assembly the frame 27, and everything carried thereby, may be raised by a suitable crane, for example, to full vertical position as indicated in dotted lines in FIGURE 2 upon removal of the pin 32. This exposes all the mechanism of the die to full view and to a wide open space in which workmen may efficiently operate to adjust, lubricate or interchange the dies. Common variables in steel joist construction are the pitch and depth dimensions of the webs, and it is contemplated by the present invention that these variations will be accomplished by removing and replacing so many of the guiding blocks 39, 44, 52' and 55 and so many of the guiding and spacing blocks 40, 43, 53 and 54 as are necessary to accomplish the desired change. Of course, suitable interchanges would also have to be made in the dies and their sliding holders but this is readily accomplished by standardizing on the pattern of threaded apertures formed in the slab 26 and by standardization as regards connections to the toggle plate 47 and to the actuating cylinders 56–58 as will be readily understood by those familiar with the die making art. The arrangement disclosed herein as for mounting the various dies—i.e. use of solid spacers and guides—is highly advantageous since the entire structure is much more rigid than it would be if cross slides and screw adjustments were utilized to change the pitch and height dimensions of the completed webs.

It should now be apparent that I have provided an improved method and apparatus which accomplishes the objects initially set out above. While the apparatus required is quite compact yet rugged and comparatively simple in design the two-stage operation of first making approximate but incomplete bends and thereafter effecting the final form and set through stretching a more accurate and uniform product is obtained. The shifting mechanism for indexing and for providing die clearance during the indexing movement of the work piece or pieces is simple and straightforward in design and is not likely to fail during long periods of high productive use. Likewise, the overall die assembly is rugged and durable, requires a minimum of power in that any necessity for accelerating and decelerating massive machine components has been entirely eliminated. Consequently, most efficient use is made of the metal and power which is built into the apparatus. Further all the power required may be supplied from comparatively small hydraulic cylinders which are easily mounted, supplied with fluid pressure, and maintained, While I have above described the wing die 59 as being slideably mounted on a carrier which swings on the pivot 60 it is possible to dispense with this sliding interconnection, if desired, by mounting the wing die directly on the pivot pin and shifting the axis of the pivot pin slightly downward and to the right as viewed in FIGURE 1A. While some slight marking of the work piece may result due to a small sliding movement of the die on the work piece this is not particularly objectionable in the kind of product herein involved, The above specifically described embodiment of my invention is, therefore, readily susceptible of many changes without departing from the spirit or scope of my invention, and accordingly reference should be had to the appended claims in determining the scope of the invention.

I claim:

1. Apparatus for making a series of alternate forward and reverse bends in a metal rod comprising a die set having an anvil die assembly forming a pair of longitudinally spaced nodes and a V-shaped recess positioned longitudinally intermediate said nodes but laterally offset with respect thereto, said die set having a pair of laterally movable clamping dies for engaging pre-bent portions of the workpiece lying on said nodes, said die set also having a laterally movable punch for forcing a reversely bent portion of said workpiece into said recess, said die set also including a pivoted wing die for bending a straight portion of said workpiece about an outer portion of one of said nodes, and a sliding clamp positioned outwardly of said wing die for engaging the workpiece and for restraining inward movement of the same whereby said wing die is operative to impart a second reverse bend in said workpiece upon operative swinging movement thereof while the resulting lateral displacement of a portion of said workpiece imparts a partial bend to the workpiece at said clamp.

2. Apparatus according to claim 1 further including means to limit the inward movement of said sliding clamp whereby incomplete bends are made by said wing die, said clamping dies and punch being operative with said anvil die assembly to coin the stock of the workpiece between successive forward bends therein into final shape and dimensions by stretching the legs of the workpiece which interconnects said forward bends and the intermediate offset reverse bend.

3. Apparatus according to claim 1 further characterized in that said die set and said sliding clamp are mounted in a common plane whereby all of the formed workpiece lies in a single plane, a carrier for said die set, and means to move said carrier away from said plane of the workpiece whereby the said dies of said die set are moved free and clear of the formed workpiece to permit longitudinal indexing movement of the latter between successive bending cycles.

4. Apparatus according to claim 3 further characterized in that said carrier is a slab-like frame, a base, means pivotally mounting one end of said frame on said base at a point remote from said dies for swinging movement about an axis generally parallel with the longitudinal axis of the workpiece, and means to tilt said frame about said axis whereby said dies are retracted from the plane of the workpiece.

5. Apparatus according to claim 4 further including guide means on said base at the opposite end of said frame and adapted to be slideably engaged by said opposite end of the frame to thereby maintain the transverse alignment of the frame and die set upon each pivotal movement of the frame which brings the dies back into the plane of the workpiece.

6. Apparatus according to claim 3 further characterized in that said anvil die assembly is slideably mounted for lateral movement in the plane of the workpiece, and means to effect such sliding movement whereby a completed section of the workpiece may be released from said anvil die assembly upon retraction of said clamping dies and said punch.

7. Apparatus according to claim 1 further characterized in that said dies and sliding clamp are of sufficient width to simultaneously bend two workpieces in contacting side-by-side relation, said clamping dies being each formed of a pair of adjacent slab-like elements for individual engagement of the workpiece sections lying on said nodes, a slideable carrier for said elements having a slot therein to slideably receive and support said elements, and means in the bottom of the slot to divide the clamping force transmitted through said carrier equally to said elements.

8. A multiple clamp for a pair of metal rods lying in side-by-side contacting relation comprising an anvil die and a clamping die opposite said anvil die operative to clamp the pair of rods therebetween, said clamping die comprising a block-like carrier guided for sliding movement toward and away from said anvil die, a deep slot in said carrier, a pair of slab-like die members partially received in said slot and having end surfaces for individual engagement with said rods, and means in the base of said slot to divide the clamping force transmitted through said carrier to said die members equally.

9. Apparatus according to claim 8 further characterized in that the base of said slot is semi-cylindrical in form, a half-round pin lying against the semi-cylindrical surface in the base of the slot, and the inner ends of said die members abutting against the opposite halves of the flat surface of said pin.

10. Apparatus for making a series of alternate forward and reverse bends in a metal rod comprising a base having a table-like upper surface and means to support an elongated workpiece for longitudinal movement across said surface, a slab-like support positioned vertically above and generally parallel with said surface, a set of bending dies carried by and underneath said support and having lateral components of movement to impart said forward and reverse bends to the workpiece, said die set being openable laterally and also being opened in a downward vertical direction from their working surfaces, and said support being vertically retractable whereby the component dies of said die set may be raised above the workpiece to permit longitudinal indexing movement thereof.

11. Apparatus according to claim 10 further characterized in that the means to vertically retract said support includes a horizontal pivotal connection between one lateral end of said support and said base, and means interconnecting the other lateral end of said support and said base to raise and lower said other end of the base in pivotal movement about said pivotal connection.

12. Apparatus according to claim 11 further characterized in that said pivotal connection and said means to raise and lower said other lateral end of said support are so constructed that said support may be pivoted up to a vertical position to provide for widely exposed access to said die set.

13. Apparatus for making steel joist webs from straight metal rods and wherein a series of alternate forward and reversed bends are made in the rods comprising a base, a feed table extending outwardly from said base and mounting a rod clamp for sliding movement toward and away from said base, means on said table to yieldingly restrain inward sliding movement of said rod clamp toward said base, and a die set mounted on said base and having an anvil die assembly forming a node, said die set also having a pivoted wing die intermediate said anvil die assembly and said rod clamp and being operative when in retracted position to laterally support a straight rod length positioned between said node and said rod clamp and when in its extended position to bend said straight portion about a portion of said node as well as about the free end of the wing die and about the exit end of said rod clamp, a clamping die for cooperating with the remaining portion of said node, the arrangement being such that with said wing die retracted said clamping die is operative to impart a bend in the leading end portion of a straight rod length about said remaining portion of said node after which and while said bend portion remains clamped the wing die may be actuated to form the additional bends above recited, means to limit the outward movement of said rod clamp, means to impart an adjustable initial inward movement to said rod clamp from its outermost limiting position, and a retractable stop for engaging the leading end of a metal rod as the same is threaded through said rod clamp when in outermost position to thereby determine the inward projection of said rod from said clamp after which said clamp is adapted to be closed and said stop retracted to permit said rod clamp to advance the leading end of the rod a predetermined distance past said node.

14. Apparatus for making steel joist webs from straight metal rods and wherein a series of alternate forward and reversed bends are made in the rods comprising a base, a feed table extending outwardly from said base and mounting a rod clamp for sliding movement toward and away from said base, means on said table to yieldingly restrain inward sliding movement of said rod clamp toward said base, and a die set mounted on said base and having an anvil die assembly forming a node, said die set also having a pivoted wing die intermediate said anvil die assembly and said rod clamp and being operative when in retracted position to laterally support a straight rod length positioned between said node and said rod clamp and when in its extended position to bend said straight portion about a portion of said node as well as about the free end of the wing die and about the exit end of said rod clamp, a clamping die for cooperating with the remaining portion of said node, the arrangement being such that with said wing die retracted said clamping die is operative to impart a bend in the leading end portion of a straight rod length about said remaining portion of said node after which and while said bend portion remains clamped the wing die may be actuated to form the additional bends above recited, said anvil die assembly including a second node spaced longitudinally from the first mentioned node, a second clamping die for said second node, and a laterally movable punch between said nodes, the arrangement being such that after operation of said wing die and subsequent longitudinal indexing movement of the workpiece the bends made by said wing die on the first mentioned node and at the rod clamp will overlie said nodes so that the last mentioned bends may be clamped against the nodes by said clamping dies after which said punch may be actuated to engage the inside of the bend made by the free end of said wing die to coin the thus clamped section of the workpiece into final form and dimension.

15. Apparatus for making steel joist webs from straight metal rods and wherein a series of alternate forward and reversed bends are made in the rods comprising a base, a feed table extending outwardly from said base and mounting a rod clamp for sliding movement toward and away from said base, means on said table to yieldingly restrain inward sliding movement of said rod clamp toward said base, and a die set mounted on said base and having an anvil die assembly forming a node, said die set also having a pivoted wing die intermediate said anvil die assembly and said rod clamp and being operative when in retracted position to laterally support a straight rod length positioned between said node and said rod clamp and when in its extended position to bend said straight portion about a portion of said node as well as about the free end of the wing die and about the exit end of said rod clamp, a clamping die for cooperating with the remaining portion of said node, the arrangement being such that with said wing die retracted said clamping die is operative to impart a bend in the leading end portion of a straight rod length about said remaining portion of said node after which and while said bend portion remains clamped the wing die may be actuated to form the additional bends above recited, said anvil die assembly including a second node spaced longitudinally from the first mentioned node, a second clamping die for said second node, a laterally movable punch between said nodes, the arrangement being such that after operation of said wing die and subsequent longitudinal indexing movement of the workpiece the bends made by said wing die on the first mentioned node and at the rod clamp will overlie said nodes so that the last mentioned bends may be clamped against the nodes by said clamping dies after which said punch may be actuated to engage the inside of the bend made by the free end of said wing die to coin the thus clamped section of the workpiece into final form and dimension, a second stop to limit the inward movement of said rod clamp to thereby cause said wing die to make incomplete bends in said workpiece, the arrangement being such that after operation of said wing die and the subsequent indexing movement of the workpiece to position the partially bent section on the anvil die and actuation of said clamping dies said punch will stretch the metal of the workpiece intermediate the nodes of said anvil die to impart a final set to the dimensions of the workpiece.

References Cited by the Examiner

UNITED STATES PATENTS

| | | | |
|---|---|---|---|
| 1,862,281 | 6/1932 | Schaefer | 29—550 |
| 2,086,736 | 7/1937 | Palmer | 153—20 |
| 2,693,637 | 11/1954 | Peabody et al. | 29—550 |
| 2,815,062 | 12/1957 | Cook et al. | 153—20 |
| 2,936,048 | 12/1960 | Smith | 140—71 |

CHARLES W. LANHAM, *Primary Examiner.*